US007694455B1

(12) United States Patent
Bowden et al.

(10) Patent No.: US 7,694,455 B1
(45) Date of Patent: Apr. 13, 2010

(54) APPARATUS AND METHOD OF MOSQUITO CONTROL

(75) Inventors: Robert Lee Bowden, Walnut Cove, NC (US); Timothy Edward Bowden, Walnut Cove, NC (US)

(73) Assignee: Wake Forest University Health Sciences, Winston-Salem, NC (US)

( * ) Notice: Subject to any disclaimer, the term of this patent is extended or adjusted under 35 U.S.C. 154(b) by 495 days.

(21) Appl. No.: 11/643,230

(22) Filed: Dec. 21, 2006

Related U.S. Application Data

(60) Provisional application No. 60/754,065, filed on Dec. 27, 2005.

(51) Int. Cl.
*A01M 1/10* (2006.01)
*A01M 1/02* (2006.01)
(52) U.S. Cl. ..................................... 43/107; 43/132.1
(58) Field of Classification Search .................. 43/107, 43/132.1
See application file for complete search history.

(56) References Cited

U.S. PATENT DOCUMENTS

| | | | | |
|---|---|---|---|---|
| 1,936,644 A * | 11/1933 | Schroder | ...................... | 43/121 |
| 3,997,999 A * | 12/1976 | Evans | ........................... | 43/107 |
| 4,002,146 A * | 1/1977 | Neff | ........................ | 119/51.04 |
| 4,019,459 A * | 4/1977 | Neff | ........................ | 119/51.04 |
| 4,328,636 A * | 5/1982 | Johnson | ........................ | 43/107 |
| 4,631,857 A * | 12/1986 | Kase et al. | .................. | 43/132.1 |
| 5,123,201 A * | 6/1992 | Reiter | .......................... | 43/107 |
| 5,896,697 A * | 4/1999 | Kang | ............................ | 43/107 |
| 5,983,557 A * | 11/1999 | Perich et al. | .................. | 43/107 |
| 6,023,884 A * | 2/2000 | Yanohara | .................... | 43/132.1 |
| 6,112,453 A * | 9/2000 | Clarke, Jr. | ..................... | 43/113 |
| 6,185,861 B1 * | 2/2001 | Perich et al. | .................. | 43/107 |
| 6,301,827 B1 * | 10/2001 | Lankster | ....................... | 43/107 |
| 6,335,027 B1 * | 1/2002 | Levy | .......................... | 43/42.06 |
| 6,337,078 B1 * | 1/2002 | Levy | ............................ | 43/131 |
| 6,338,220 B1 * | 1/2002 | Dicks | ......................... | 43/132.1 |
| 6,346,262 B1 * | 2/2002 | Levy | ............................ | 43/131 |
| 6,389,740 B2 * | 5/2002 | Perich et al. | ................ | 43/132.1 |
| 6,618,984 B1 * | 9/2003 | Li | .................................. | 43/107 |
| 6,665,979 B1 * | 12/2003 | Hsu | ............................. | 43/107 |
| 6,708,443 B2 * | 3/2004 | Hall | ............................ | 43/107 |
| 6,886,293 B2 * | 5/2005 | Forehand | ...................... | 43/107 |

(Continued)

FOREIGN PATENT DOCUMENTS

DE          3316045 A1  *  11/1984

(Continued)

*Primary Examiner*—Darren W Ark
(74) *Attorney, Agent, or Firm*—Myers Bigel Sibley & Sajovec

(57) ABSTRACT

A mosquito control trap taking advantage of the normal stages of development for a mosquito. The trap including stagnant water trapped within a container by a weeping platform floating on top of the water. A series of holes in the weeping platform provide exposure of the water to form brood cups in which female mosquitoes lay eggs. In order to develop through the larva and pupa stage the developing insects must enter the larger reservoir of stagnant water, since there is insufficient room in the brood cups. However, the holes are too small to permit escape of the adult mosquito, thus preventing any of the eggs from developing. This device provides a means for controlling mosquitoes without the use of pesticides and is especially suitable for use in lesser developing countries.

15 Claims, 8 Drawing Sheets

U.S. PATENT DOCUMENTS

| | | | |
|---|---|---|---|
| 6,990,768 B1 * | 1/2006 | Boston | 43/107 |
| 7,073,287 B2 * | 7/2006 | Lau | 43/107 |
| 7,134,238 B2 * | 11/2006 | Forehand | 43/107 |
| 7,281,350 B2 * | 10/2007 | Wilbanks | 43/107 |
| 7,434,351 B2 * | 10/2008 | Bette | 43/107 |
| 7,448,160 B2 * | 11/2008 | Roberts | 43/107 |
| 2005/0210735 A1 * | 9/2005 | Harmer et al. | 43/107 |
| 2005/0274061 A1 * | 12/2005 | Zhu | 43/107 |
| 2005/0279016 A1 * | 12/2005 | Williams et al. | 43/107 |
| 2006/0021275 A1 * | 2/2006 | Howse | 43/107 |
| 2006/0090391 A1 * | 5/2006 | Huang | 43/107 |
| 2006/0248782 A1 * | 11/2006 | Dancy | 43/107 |
| 2007/0044371 A1 * | 3/2007 | Meier et al. | 43/107 |
| 2007/0074447 A1 * | 4/2007 | Kalogroulis | 43/107 |
| 2007/0157508 A1 * | 7/2007 | Chang | 43/107 |
| 2007/0214711 A1 * | 9/2007 | Mignot | 43/107 |
| 2009/0260277 A1 * | 10/2009 | Lebost | 43/107 |
| 2009/0277076 A1 * | 11/2009 | Boston | 43/132.1 |

FOREIGN PATENT DOCUMENTS

| | | | |
|---|---|---|---|
| FR | 2852490 A1 * | 9/2004 | |
| GB | 2410668 A * | 8/2005 | |
| JP | 01273534 A * | 11/1989 | |
| JP | 10146145 A * | 6/1998 | |
| JP | 2003061541 A * | 3/2003 | |
| JP | 2003144031 A * | 5/2003 | |
| JP | 2005087199 A * | 4/2005 | |
| JP | 2006223276 A * | 8/2006 | |
| JP | 2007215469 A * | 8/2007 | |
| JP | 2007236359 A * | 9/2007 | |
| JP | 2008307037 A * | 12/2008 | |
| WO | WO 03007710 A1 * | 1/2003 | |
| WO | WO 2007032745 A1 * | 3/2007 | |

* cited by examiner

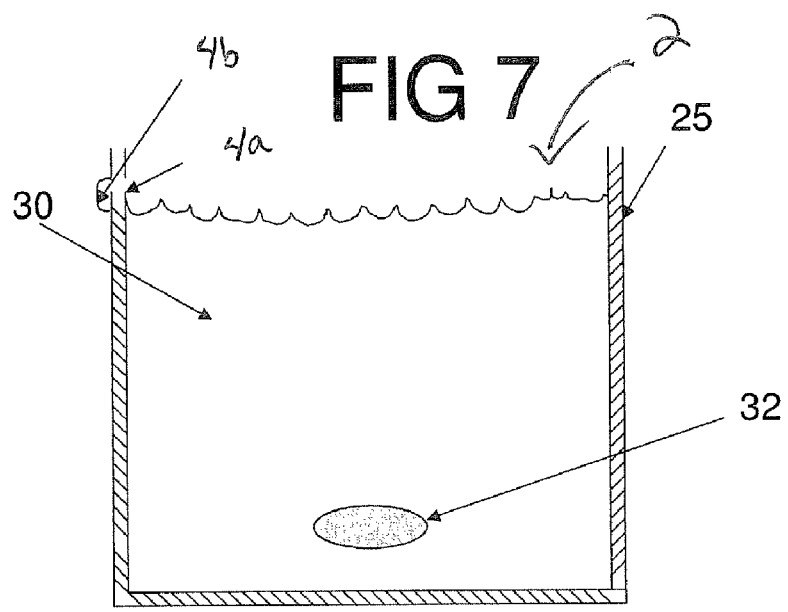
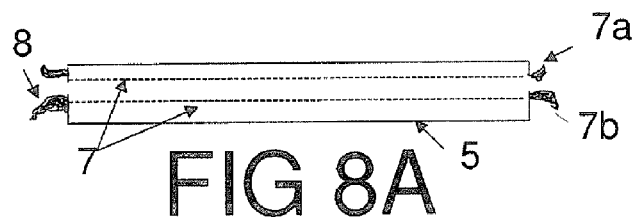
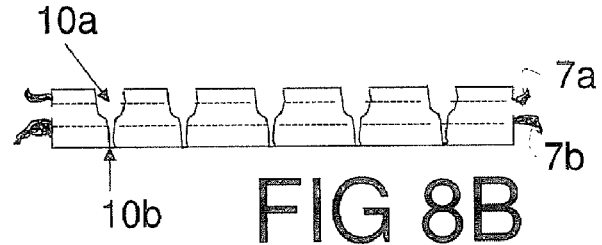
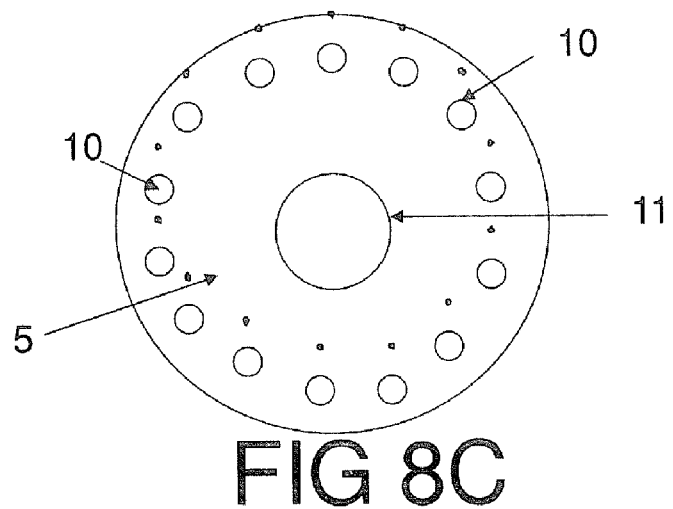

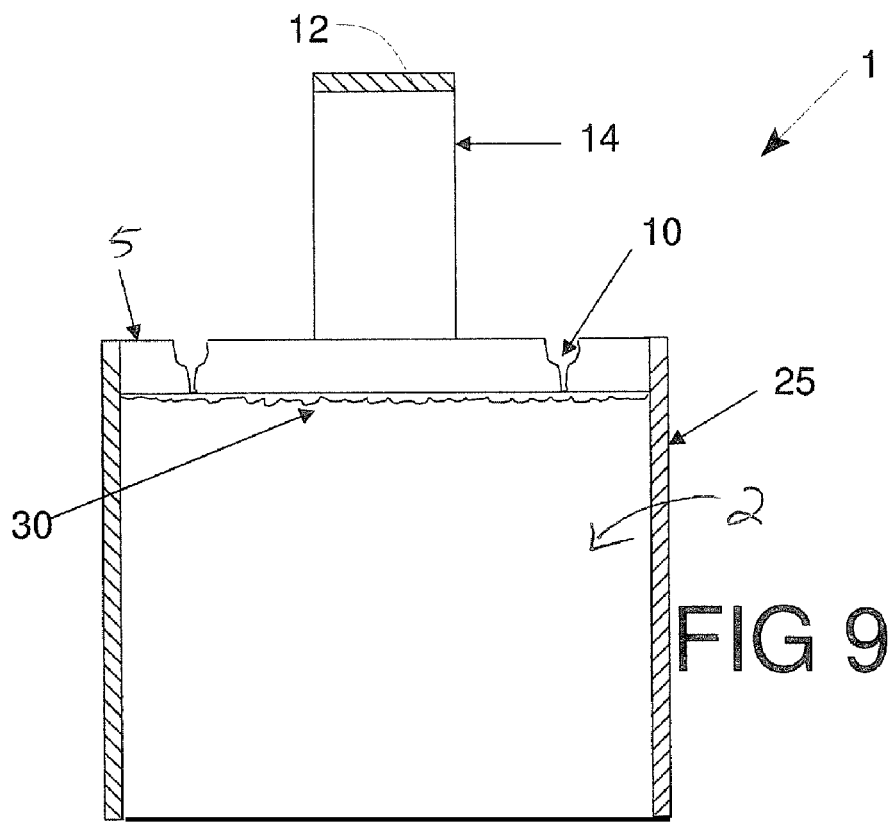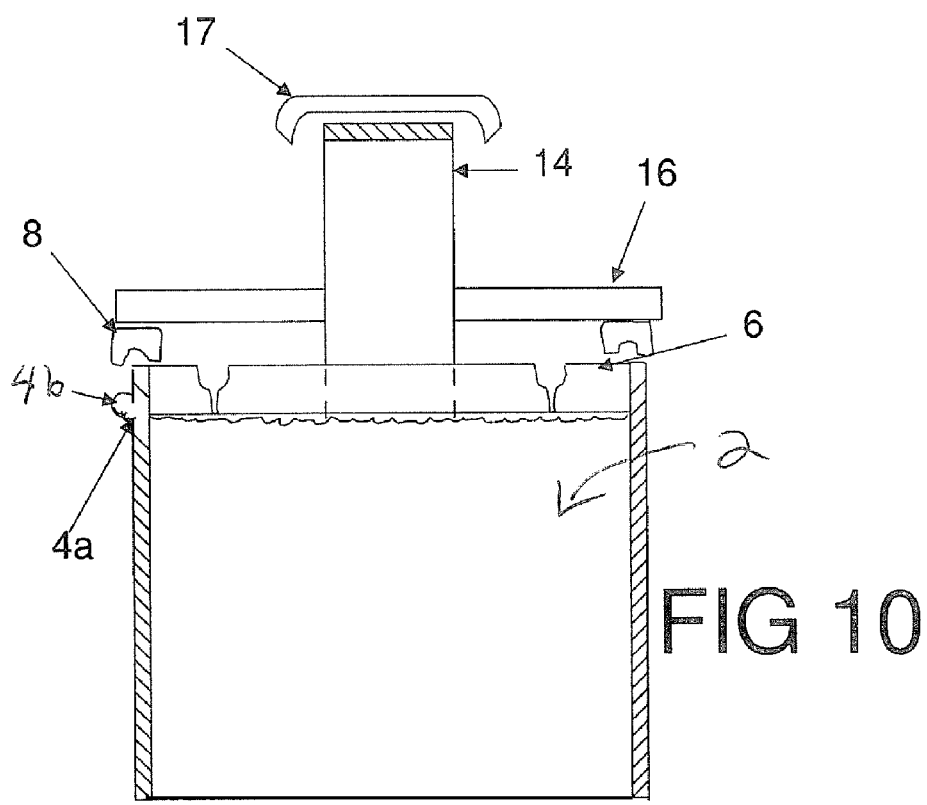

APPARATUS AND METHOD OF MOSQUITO CONTROL

CROSS REFERENCE TO PRIOR CO-PENDING PATENT APPLICATION

This application claims the benefit of prior U.S. Provisional Patent Application Ser. No. 60/754,065 filed Dec. 27, 2005.

BACKGROUND OF THE INVENTION

It is said that in the history of the world; mosquitoes and their diseases have killed more people than all wars.

From the inception, research, and development of this mosquito capturing device; the tropical third world countries was the main priority. This invention is certainly for countries where there is a lack of money and technology. This low-tech, (literally no-tech) apparatus is well suited for these populations. These are the populations who are afflicted by the diseases transmitted by the mosquito. One could postulate that this invention which is good for the third world countries can also be utilized by first and second world countries. This places into the hands of the average person a means of combating this nuisance and vector for the spread of disease—the mosquito. This invention is a simple non-toxic method for controlling the mosquito.

This invention confines the eggs, male and female so the life cycle of the mosquito is broken.

The mosquito is of the family cullicidae, order diptera. The mosquito's are the most adaptable and successful insect on earth. There are approximately 3,000 species world wide. Approximately 167 species of mosquitoes are found in the United States. A real problem is that virtually any natural or man-made collection of water can support mosquito production. Mosquitoes have been found on mountain peaks at 14,000 feet and in mines a mile below the earth's surface. Only a few of these species are important as carriers of disease, but many can be a nuisance.

No matter what the mosquito species, water is essential for breeding. The mosquito larvae prefer still water. All mosquitoes have four stages of development—egg, larva, pupa, and adult. The larval and pupal stages are spent in water. This water is often stagnant and close to home. One should reduce the availability of water suitable for larval and pupal growth by always inspecting the following as a water source and eliminating the cause. The best way to keep mosquitoes away from your home is to clean up areas where they like to breed such as, flowerpot saucers, tires and tin cans, kid's toys, roof gutters, ornamental pools (stock with fish), bird baths and fountains. Containers for collecting rain water (should be covered with a screen). Mosquitoes require very small amounts of standing water to their lay eggs.

Mosquitoes have complete metamorphosis. The egg is elongated, about one millimeter long and is laid in batches of 50-300. One female may lay several batches. The female is the only mosquito that bites man or animal. The reason the female bites is for a blood meal, which provides proteins necessary for egg development. Eggs can hatch in one to three days if laid on warm water. Many species lay eggs that remain dormant in the soil for years before hatching, so even in unfavorable weather they can survive. The larva lives in water but breathes air through a siphon. The siphon penetrates the water surface. Mosquito larvae feed on microorganisms and organic particles. The larvae mouth parts are modified into brushes which draw food into the mouth. During the larval stage four separate developmental periods occur called instars. As the mosquito larva grows, it must cast off its exoskeleton and replace it with a larger one. A larva changes into a pupa in about a week.

The pupa stage lasts for one or two days. During this stage the mosquito changes its' life form from a larva that lives in water to a flying adult that lives in a terrestrial environment. The male emerges from the pupa case first and rests near the breeding site. The male mosquito feeds on nectar from flowers. The female mosquito seeks a blood meal necessary for egg development following mating. Without blood, mosquito eggs could not be produced. Mosquitoes select specific hosts from which to blood feed. Some mosquitoes feed on mammals, others only on birds. In some parts of the world, mosquitoes feed only on humans.

One factor common to all mosquito species is that eggs are laid in association with free water or on a moist surface. Eggs are white when first deposited, darkening to a black or dark brown within 12-24 hours. Single eggs are about 1/50 inch (0.5 mm) long, and those of most species appear similar when seen by the naked eye (one exception is the *Anopheles* spp. whose eggs have floats attached to each side of the egg). Eggs are laid singly by some species, and other species lay eggs together to form rafts. The incubation period (time between when eggs are laid and when they hatch) may vary considerably among species. Eggs of permanent-water mosquitoes where eggs are deposited on the water surface may hatch in 1-3 days depending on temperature. Floodwater species deposit their eggs on moist soil or another wet substrate and have a wide variation in incubation periods. These eggs will not hatch until submerged by rising water caused by rainfall, melting snow in the spring, or other floodwater. Depending on the species and conditions these eggs may hatch the next time they are flooded, as soon as ten days, or may not hatch until they are flooded a year or more later.

The larvae (wigglers or wrigglers) of all mosquitoes live in water and have four developmental periods or instars. These are called 1st, 2nd, 3rd, and 4th instars with each succeeding stage larger than the last. At the end of each instar, the larva sheds its skin by a process called molting. The larva is an active feeding stage. Larvae feed on particulate organic material in the water. The larvae of most species have a breathing tube and must occasionally come to the surface of the water to get oxygen. The total length of time that larvae spend in the larval stage depends on the species and the water temperature. Some can develop in as little as 5 or 6 days. Upon maturity the 4th instar larvae molts into the pupal stage.

Unlike most other insects, the mosquito pupa is very active, and, like the larva, lives in water. It differs greatly from the larva in shape and appearance. The pupa has a comma-shaped body divisible into two distinct regions. The front region consists of the head and thorax (cephalothorax) and is greatly enlarged. It bears a pair of respiratory trumpets on the upper surface. It must periodically come to the surface to get oxygen. The second region is the abdomen which has freely-movable segments with a pair of paddle-like appendages at the tip. Feeding does not take place during the pupal stage. The pupal stage only lasts for a few days and is the stage when all the larval tissues change into the adult tissues. The adult emerges directly from the pupal case on the surface of the water.

The adult mosquito is entirely terrestrial and is capable of flying long distances. Both females and males feed on nectars, which they use for energy. Males and females mate during the first 3 to 5 days after they have emerged. Females mate only once. Males generally live for only a week. Only the females feed on blood, which is what is occurring when they are biting. Females evidently gain little nourishment from blood meals but need them in order to develop eggs. Many mosquitoes feed on any warm-blooded bird or mammal. However, some prefer cold-blooded animals. Some species also prefer birds and seldom feed on mammals, which is the case with *Culex* spp. mosquitoes which are known to transmit the West Nile virus (WNV). Unfortunately many species feed on a wide range of warm-blooded mammals, and humans are often attacked. Once a female has completely engorged, she flies to a shaded environment until her eggs are completely developed, usually in 3 to 5 days. Once the eggs are developed the female is called a gravid female and she begins to search for a desirable place to lay her eggs. If a female survives her egg laying activities, she will very soon start searching for another blood meal after which she will lay another batch of eggs. She does not need to mate a second time. Generally a female will only live long enough to lay 1 to 3 batches of eggs.

Most mosquito species are actively searching for a blood meal in the evening hours from just before dark until 2 to 3 hours after dark. During the daytime the females normally rest in cooler vegetated areas where the humidity is higher and they are protected from drying out. Females will often bite in the daytime if humans or animals invade the wooded areas where they are resting. However, *Aedes albopictus* is an aggressive biter, which prefers to feed during the daylight hours and is often a nuisance in urban areas.

Mosquito Control

Dichlorodiphenyltrichloroethane (DDT) was the first modern pesticide. DDT was developed early in World War II by Paul Hermann Muller. Muller was awarded a Nobel Prize in physiology or medicine in 1948 for his discovery of the highly effective DDT. DDT was used initially with great effect in combating mosquitoes spreading malaria, and typhus.

In 1962 an American activist, Rachel Carson published the book Silent Spring. Her book alleged that DDT caused cancer and also harmed bird reproduction. This book resulted in a public outcry; this eventually led to the pesticide being banned for use in the United States. There is still a great controversy regarding the environmental impact of DDT.

In some parts of the world there are efforts to bring back DDT; especially where the mosquito is the vector for malaria. For these reasons there is a need for a safe non-toxic, effective and simple way of controlling the mosquito population.

Here to fore efforts by individuals to control mosquitoes on their property rarely succeed. Control is a real problem because some mosquito species fly far from breeding sites. This has resulted in community wide efforts to treat breeding sites or apply insecticidal sprays to control the adult mosquito.

Repellants are used for personal protections from mosquitoes. These products contain DEET, in the form of lotions, aerosol spray, or cream, which display warning labels especially for children. Repeated use of these repellents over a short period of time is not recommended. Pregnant women and children should not use DEET containing products too often, if at all. There is also caution for using repellants on areas covered by clothing. One should not apply repellants to the hands of children for they can get the repellants into their eyes or mouth. Most of these products are also combustible.

A nonchemical control measure is the burning of candles containing oil of citronella. Oil of citronella products can help rid an area of mosquitoes, but it will not totally prevent bites and can become ineffective in windy conditions. Citronella plants can help fend off bugs, too, but only in enclosed spaces. Similarly, personal protection such as wristbands with citronella, lemon grass and other natural ingredients do ward off some mosquitoes, but do not completely prevent bites nor deter their life cycle.

One method of mosquito control known not to work is the "bug zappers". A recent study at the University of Delaware concluded that less than ¼ of the 1% of the insects zapped in such devices were actually biting insects. The majority of insects killed in electrocution traps are actually beneficial in some form to the environment.

Outdoor foggers will only keep mosquitoes away for a few hours. When the chemical (dangerous to children and perhaps you) dissipates the mosquitoes return.

Insecticides are available for controlling larvae. The applications of insecticides in large bodies of water or small breeding sites can be expensive and difficult. Again these chemicals are not selective and harm beneficial insects. Most insecticides are toxic not only to mosquitoes but can also be toxic to humans and other forms of life in the environment. It is necessary for all persons responsible for the use of insecticides to recognize this and take precautions to insure that these chemicals not only do not cause illness or death but also do not unnecessarily contaminate the environment.

The use of pesticides must be registered with the EPA and undergo a rigorous pesticide review process before they can be used in the United States. With the use of pesticides safety for humans and the environment are always a consideration. The pesticide should always be used according to label directions and strict precautions. Pesticides are tested for adverse effects on humans, wildlife, fish, and plants. Other adverse effects can be the risk of contaminating surface water or ground water. Another consideration with pesticides is spray drift, there is no pesticide that is 100% safe, and there is always a condition "the weather permitting".

There are mosquito trapping and vacuum systems. These systems use C02, heat, octenol, vacuum, and light. These devices are expensive and, may attract more mosquitoes than one would ordinarily deal with. These devices also eliminate beneficial insects.

One commercially available mosquito halo inhibitor system is described by its manufacturer as a dual system that has an apricot smelling scent and an ultrasonic speaker. This inhibitor claims to reduce mosquito landing count by an average of 50%-75%. This product is relatively inexpensive but it doesn't reduce the mosquito population, it is simply stated that it reduces landing count.

Another control effort is mosquito magnets. The magnet operates by mimicking human breath and emits a warm, moist carbon dioxide plume combined with an attractant. This method is expensive, requires a lot of maintenance and could possibly attract more mosquitoes than one would ordinarily encompass. This method also poses death to our beneficial insects.

There are larvicide's made from extract of the chrysanthemum flower (permethrin). This can be mixed with mineral oil and sprayed but is proven to be a short term deterrent that requires multiple applications.

There is a garlic repellent for spraying on yards, garden, parks and grassy areas and also plant based products such as eucalyptus lotions that portray themselves as repellants. Many of these products contain warning labels and require continuous reapplication. These may perhaps be short term repellants, deterrents but they do not address the reproduction and vicious lifecycle of the mosquito.

All of the above mentioned items can be costly, ineffective and dangerous.

SUMMARY OF THE INVENTION

This invention is species selective and only eliminates the mosquito. It will not harm any beneficial insects, which is extremely important to our future environment. This mosquito apparatus is most environmental friendly, no toxins, no sprays, no harm to the environment, people, pets, etc. and would bear absolutely no warning label.

This invention takes advantage of the biology and life cycle of the mosquito. Stagnant water is the common denominator for the 3,000 species of mosquito. This invention offers the stagnant water for the female mosquito to lay eggs on. In the small cups of water (brood cups) the eggs can develop into larva. In the larval stage the larva must descend into the depths of the stagnant water in order to feed. Literally from the time the eggs are laid the mosquito is captive in this apparatus.

The mosquito can complete their entire life cycle in this apparatus, but cannot escape into the environment. When they reach the adult flying stage they cannot escape, but die and fall back into the pool of stagnant water. The dead mosquito then becomes food for the developing larva.

Basically this invention is a one way system, a liquid check valve which takes advantage of the life cycle of the mosquito. This invention is on duty 24 hours a day, seven days a week with no threat to our environment or our children.

Attracting, trapping and killing just one female mosquito at the start of mosquito season can prevent the birth of up to 25,000 more mosquitoes that season alone! This invention will eliminate millions.

BRIEF DESCRIPTION OF THE DRAWINGS

FIG. 7 is a schematic showing a typical water level in the container and showing an algae disc that can be inserted to provide nutrition to the trapped larvae.

FIGS. 8A-8C are schematic views of the weeping platform. FIG. 8A is a side view of the circular weeping platform. FIG. 8B is a view illustrating the brooding cups, and FIG. 8C is a top view showing the brooding cups and the opening through which the tower extends.

FIG. 9 is a schematic showing the weeping platform floating on top of the water in the container.

FIG. 10 is another schematic, similar to FIG. 9, but including the debris and tower covers.

DETAILED DESCRIPTION OF THE PREFERRED EMBODIMENT

Figure 1:
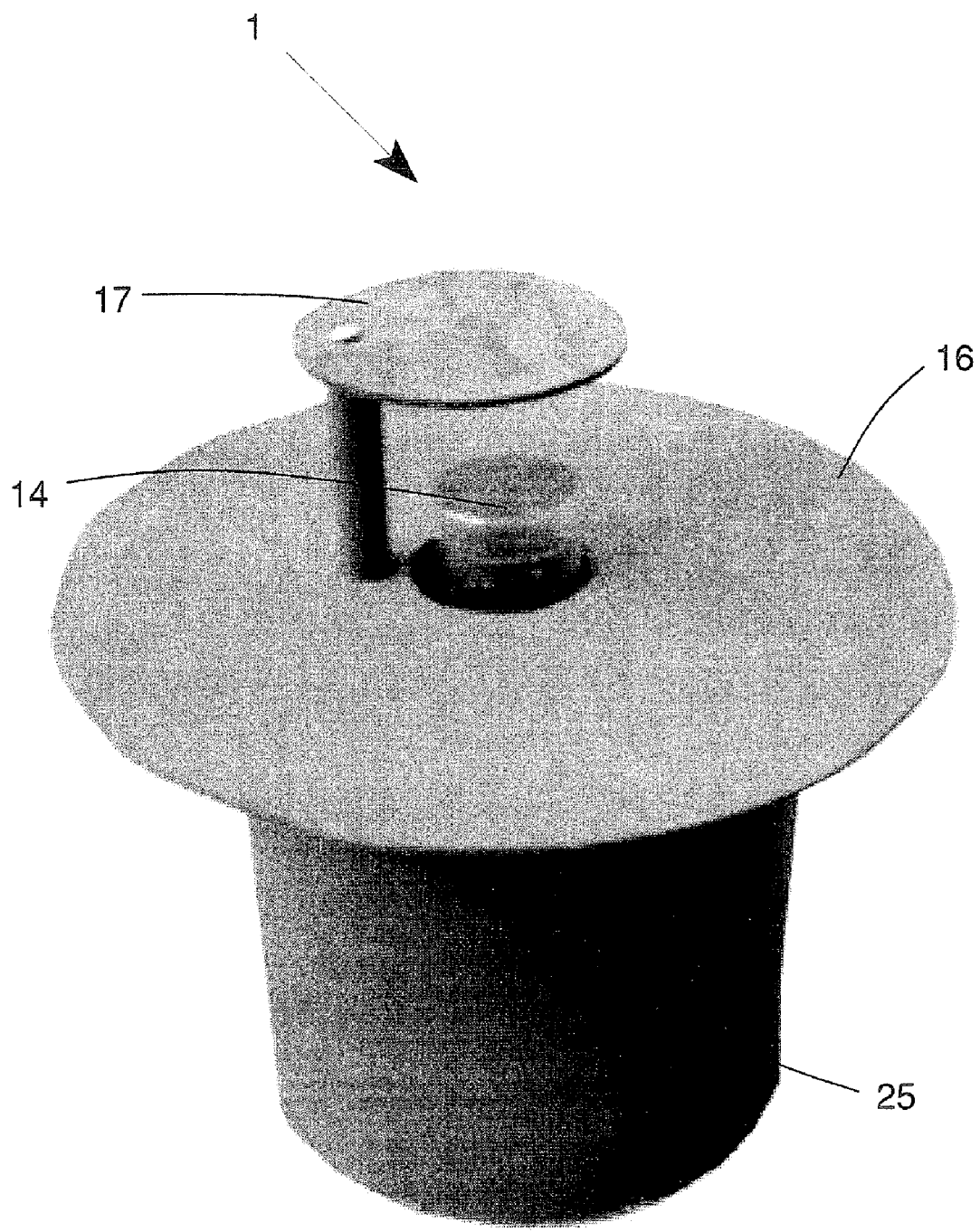
FIG. 1 is a view of the mosquito control apparatus of this invention.

This invention provides a device or mosquito trap 1 for eradicating mosquitoes, without the use of insecticides or toxic chemicals, simply by taking advantage of the normal lifecycle of the mosquito. Specifically this invention takes advantage of the fact that the female mosquito lays her eggs in stagnant water in the initial development of the mosquito occurs in the water. A preferred embodiment of this apparatus or trap 1, and the way of the various components are assembled to form this apparatus 1 is shown in FIGS. 1-6. This invention can comprise an apparatus 1 having a container 25 filled with stagnant water. The container 25 and the other components of apparatus 1 can be sized according to its specific application. For example, a container sold over the counter for residential use can be relatively small, while a container that would be suited for use in a large outdoor areas, such as a park, can be in the form of a large tub. The apparatus 1 can either include a container for the 25 suited for specific applications or other components, such as the weeping platform 5 and the debris cover 16 can be sized so that they can fit standard containers, buckets or tubs.

FIG. 1 is an exterior view of the mosquito control apparatus 1 showing the manner that a debris cover 16 can be mounted on the generally cylindrical container 25. A tower 14 extends through a hole in the debris cover 16, and a tower cover 17, mounted on the debris cover 16 extends over the tower.

Figure 2:
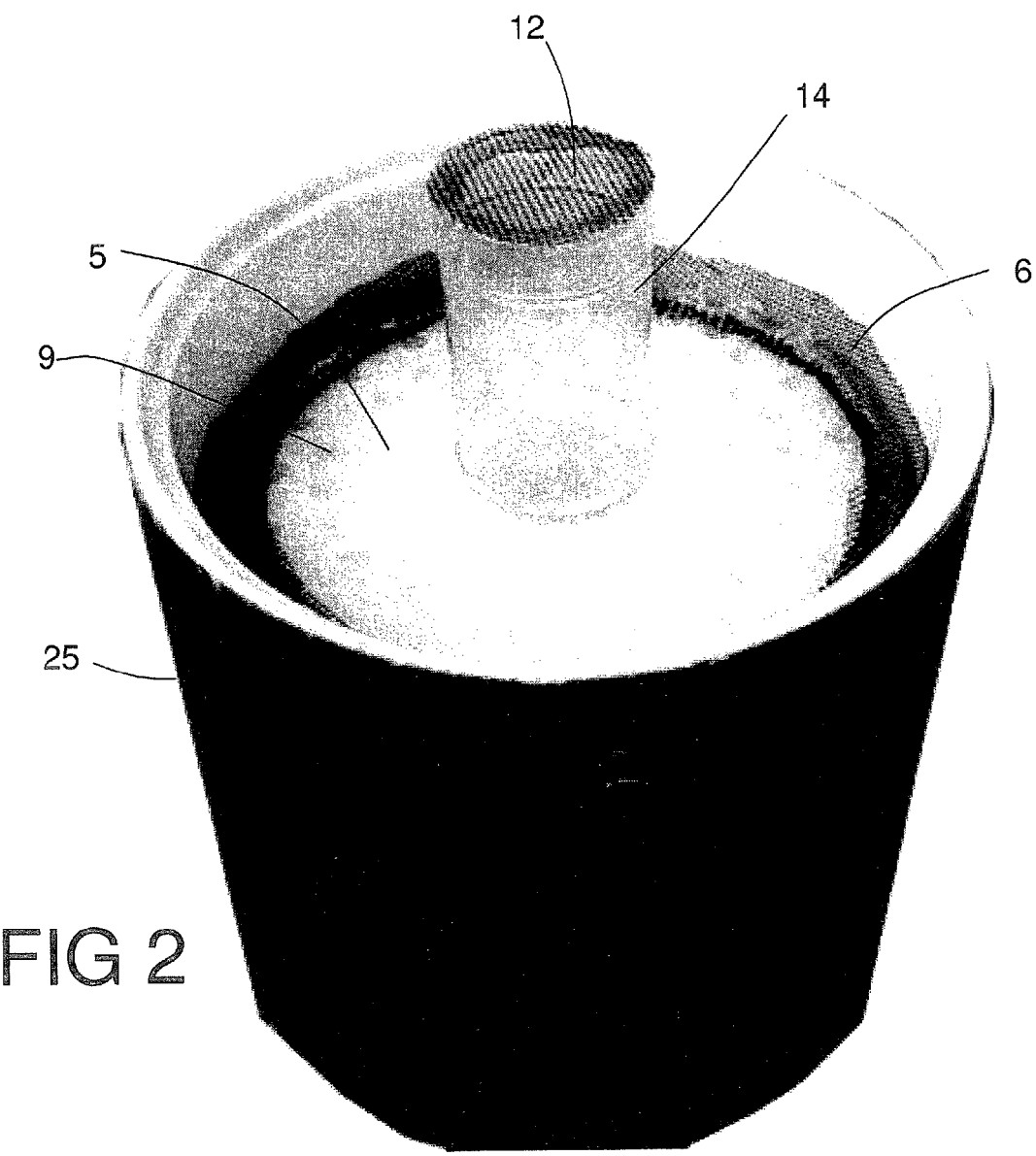
FIG. 2 is a view of the weeping platform located in the container after removal of the cover shown in FIG. 1.

FIG. 2 shows the device of FIG. 1 with the debris cover 16 removed from the container 25 to reveal the weeping platform 5, which will float on water in the container 25. The tower 14 is mounted on the center of the weeping platform 5, and comprises a hollow cylindrical member, which is preferably transparent. A mesh cover 12 is located on the top of the tower 14. A mesh screen 6 extends around the weeping platform 5 and screen 6 engages the interior surface of the container 25 to prevent mosquitoes from escaping around the edge of the circular weeping platform 5. The mesh screen 12 will prevent the escape of mosquitoes through the tower 14. A series of brooding cups 9 are formed around the weeping platform 5, and these brooding cops 9 comprise openings that extends through the weeping platform 5.

Figure 3:
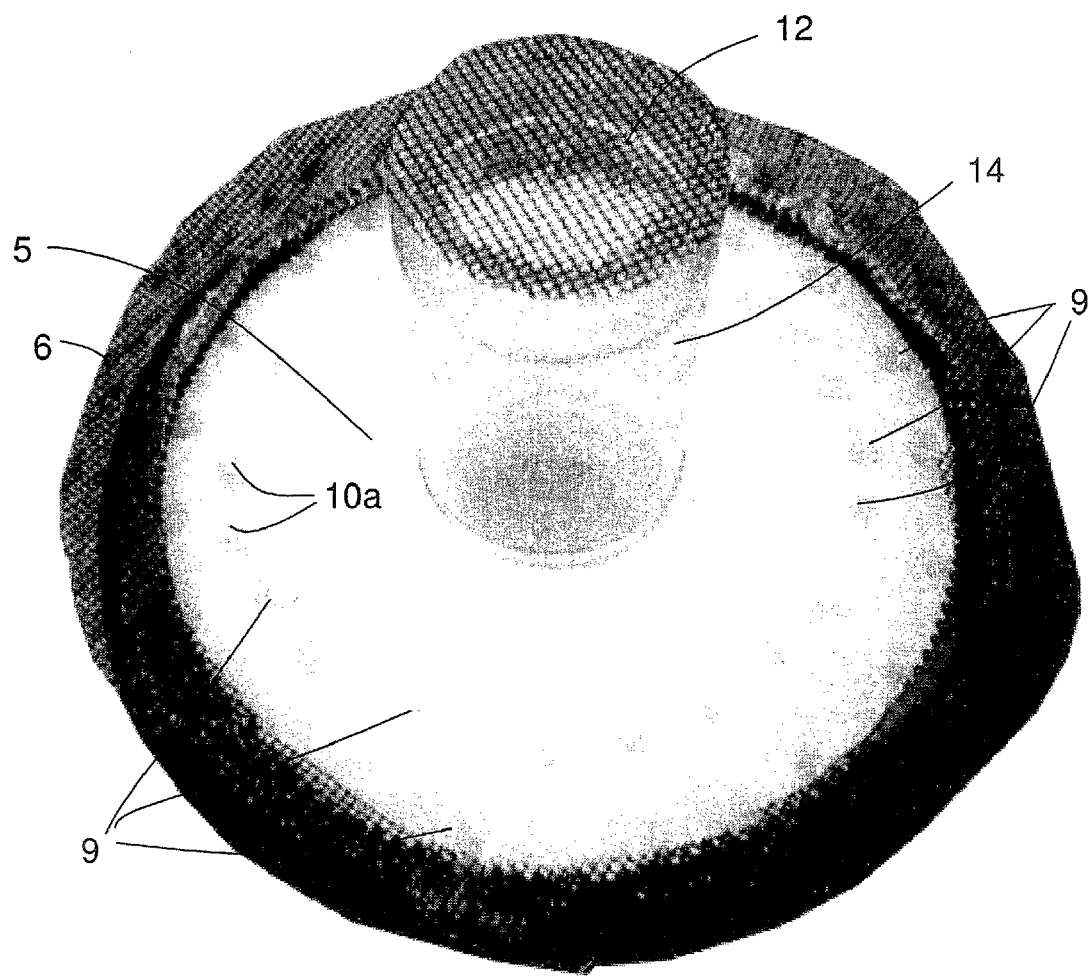
FIG. 3 is a view of the weeping platform after removal from the container.

FIG. 3 shows additional details of the weeping platform 5. The breeding cups 9 each have a countersunk or tapered upper surface 10a, which will provide adequate space for a female mosquito to lay her eggs. The outer mesh screen 6 is mounted on the periphery of the circular weeping platform 5 so that it extends completely around the exterior. The transparent tower 14 extends through an opening in the center of the weeping platform 5 so that the interior of the tower 14 will be exposed to water below the weeping platform 5.

Figure 4:
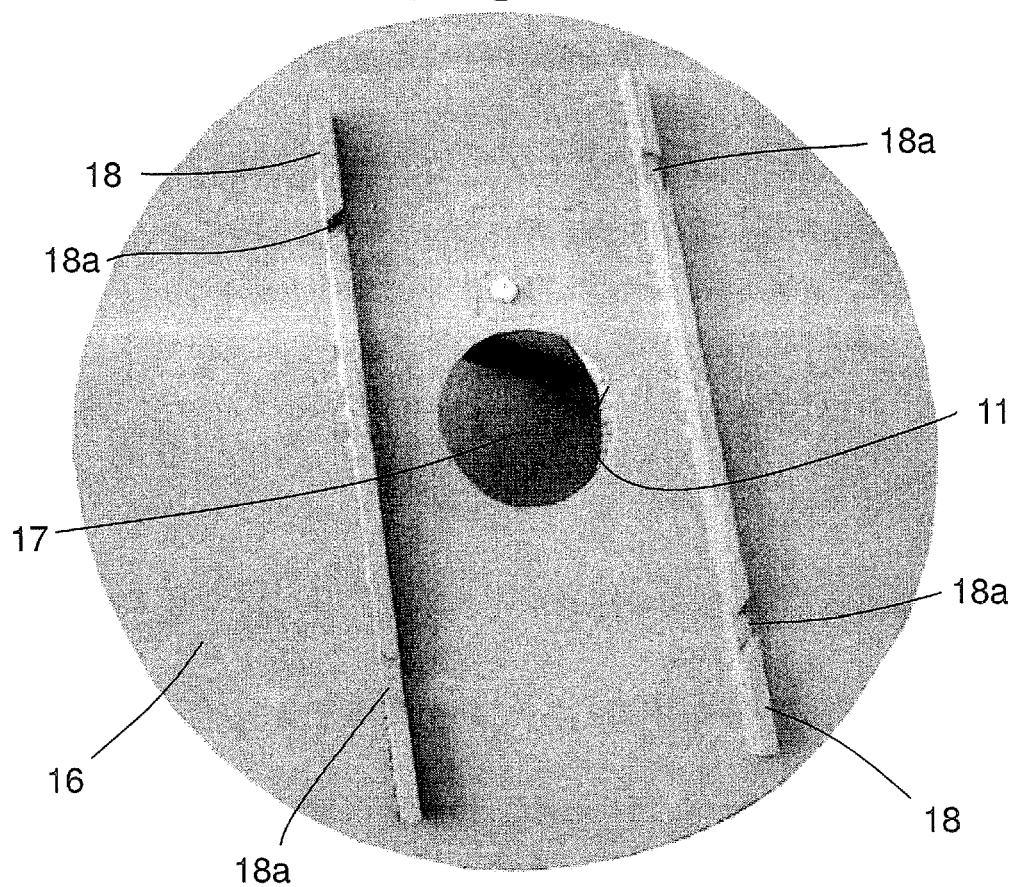
FIG. 4 is a view of the bottom surface of the debris cover
Figure 5:
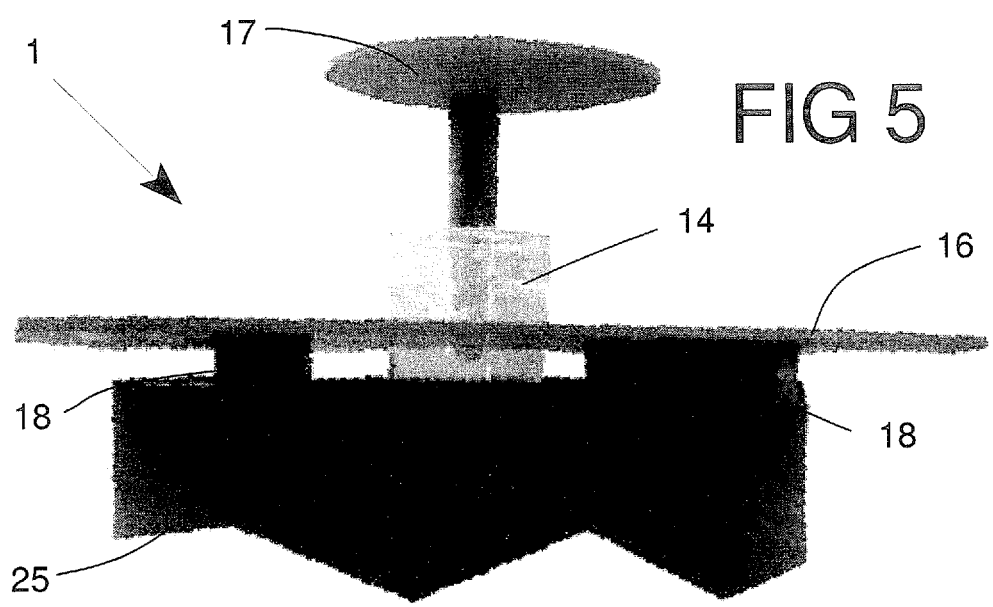
FIG. 5 is a partial side view of the mosquito control apparatus showing the gap between the debris cover and the container through which a female mosquito can gain access to the weeping platform to lay its eggs in the water in the brooding cups.

FIG. 4 shows the lower surface of the debris cover 16 through which a central opening 11 extends. The tower cover 17 is visible through this opening 11. A pair of rails 18 extends along this bottom surface and slots 18a are provided so that the rails will fit on the top rim of a cylindrical container 25. FIG. 5 shows how these rails 18 mount the debris cover on the container 25 leaving a gap through which a mosquito can obtain access to the brooding cups 6 on the top of the weeping platform 5.

Figure 6:
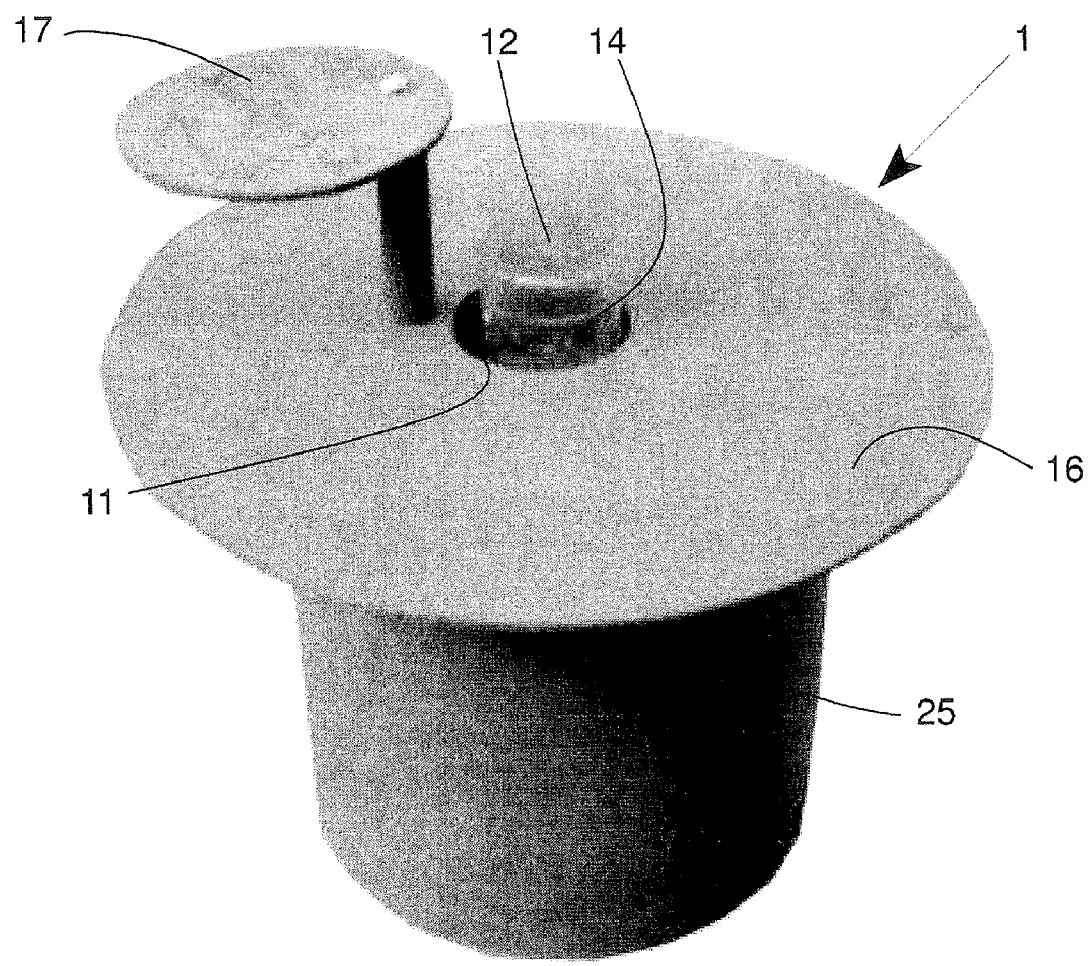
FIG. 6 is a view of the mosquito control apparatus as shown in FIG. 1, with the tower cover removed so that the container may be refilled with water.

FIG. 6 is similar to FIG. 1, but it shows how the tower cover 17 can be rotated so that the top of the tower 14 is accessible. Water may be poured through the screen 12 and the tower 14 to refill the water in the base 25 below the weeping platform.

FIGS. 7-11 are schematics which show further details of the mosquito control apparatus shown in FIGS. 1-6, and demonstrate how the apparatus and its components function.

FIG. 7 is a view, partially in section, of a stagnant water container 25 including, stagnant water 30, an algae disc 32, a screened overflow hole 4a, and a screen 4b covering the overflow hole 4a.

Figure 11A:
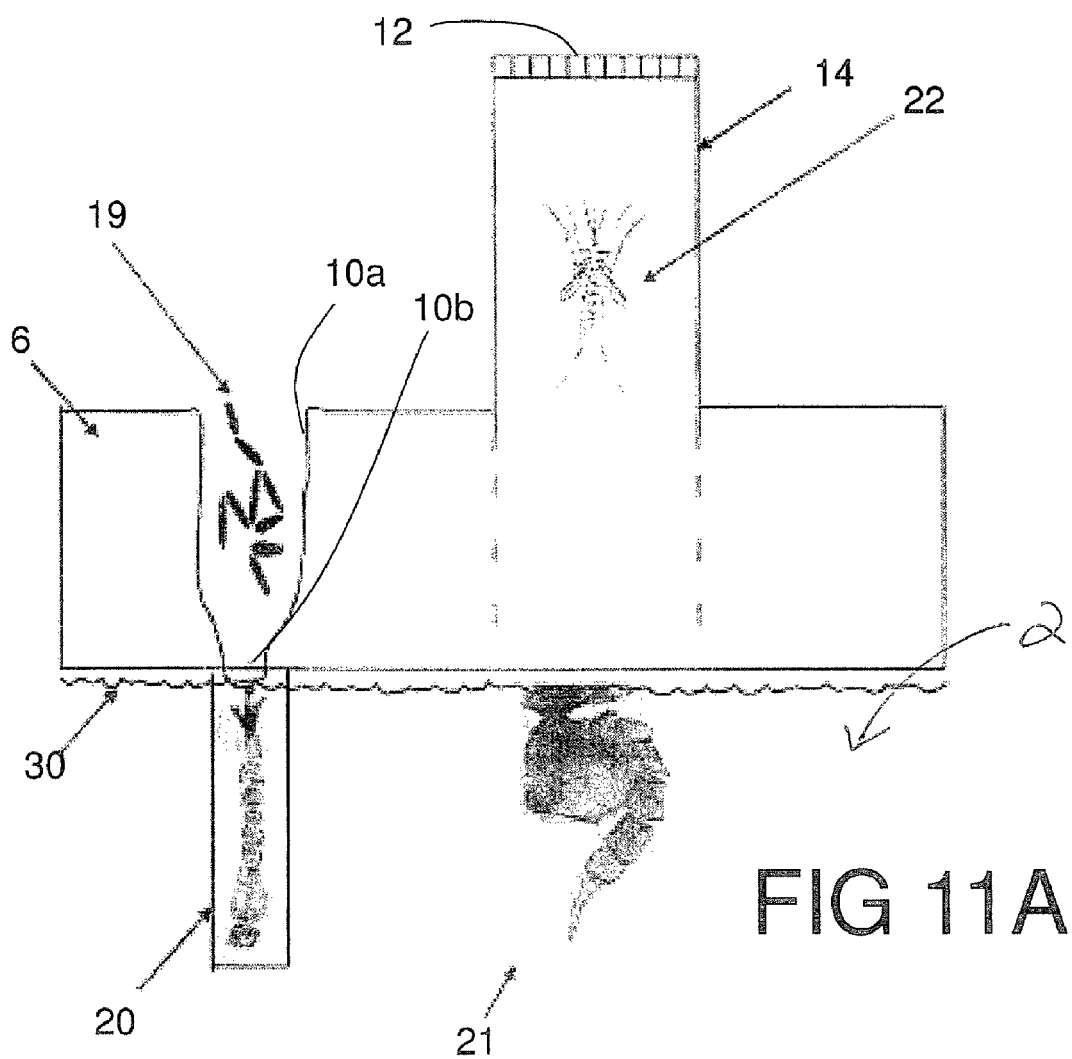
FIG. 11A is a schematic view illustrating the size of the mosquito eggs, pupa and larvae relative to components of the mosquito control apparatus.

As illustrated in FIGS. 8A-8C, the weeping platform 5 includes a series of holes 9, extending from the top to the bottom of the weeping platform 5. In the preferred embodiment, these holes 9 are countersunk so that the diameter at the top 10a is larger than the diameter at the bottom 10b as seen in FIG. 8B. For example, the diameter at the top can be 5/16", while the diameter at the bottom can be 1/16". These holes 9 provide the only space where water is exposed to the environment, and the female mosquito would lay her eggs 19 in the larger diameter portion on the upper surface of the weeping platform 5, as shown in FIG. 11A.

The weeping platform 5 also includes a central hole or opening 11, which will provide space for an observation tower 14. The observation tower 14 and the hole are not essential for all embodiments, but they do provide a means for determining if the device is working effectively as well as a means for observing the life cycle of the mosquito if the device is used for educational purposes.

Fiberglass mesh extension 6 are provided around the periphery of the weeping platform 5 so that a working seal can be provided between the platform 5 and the inner surface of the container 25, so that mosquitoes cannot escape from the container 25.

FIG. 9 shows the weeping platform 5 position in the container 1 about the stagnant water 2. The holes 9 fill with water to form the brood cups as shown in FIG. 11A. As shown in FIG. 4, an overflow hole 7 covered by a screen 5 is located near the top of the container 1. The weeping platform 5 will then not escape the container 1 if too much water is added.

FIG. 9 shows a weeping platform 5 that is located in the container on top of the water 30 at least partially filling the container 1. In the preferred embodiment, the weeping platform 5 can include a paraffin layer, which will float on the top of the water 30. It should be understood, however, that other materials the will float can be substituted for the paraffin material.

The weeping platform 5 shown in FIGS. 8A-8C is made of paraffin, or other material that will float and two layers of fiberglass mesh 7a and 7b in the paraffin. Fiberglass extensions of the two layers can form an upper mosquito seal 7a and a lower seal 7b. A 5/16" inch counter sunk hole 10a in paraffin platform 5. These countersinks 10a are the important brood cups 9. A 1/16" inch hole 10b extends through the weeping paraffin platform. The counter sink is approximately half way through the weeping platform, and a cut out in the weeping paraffin platform for attachment of the observation tower.

Debris covers 16 and 17 are mounted above the weeping platform 5 and the observation tower 14 as illustrated in FIGS. 9 and 10 so that debris, such as leaves do not prevent access to the water in holes 9 by the mosquitoes. Supports 18 located several positions raise the debris cover 16 above the weeping platform 5 so that female mosquitoes can lay their eggs in the water in holes 11.

FIG. 9 shows a container, this providing a pool of stagnant water. Water is the common denominator for the 3,000 species of mosquitoes world-wide. The flexible part of this invention is that it can be adapted to any size to meet the mosquito threat presented. The container should be of an opaque material and the stagnant water, even if the water used is fresh water, an algae disc can be placed into the water by the manufacture or the water can become stagnant on its own and this timeframe would depend on the temperature and season.

This view also shows a screen for the upper extent of the observation tower, a clear plastic observation tower, and water filling the 5/16" inch brood cups of the weeping paraffin platform.

FIG. 10 is similar to FIG. 9, but shows covers over both the weeping platform 5 and the observation tower 14, such as that shown in FIGS. 1 and 6. FIG. 10 is a side sectional view including an overflow hole, provided for ease of filling and refilling the container. The hole is very simple to fill when water is needed. The overflow hole 4a will ensure that the platform cannot be pushed out of the container with too much water. A screen 4b for the overflow hole 4a to prevent mosquitoes at any stage of development from escaping into the environment is also shown. This view also includes a paraffin weeping platform, and an observation tower 14, comprising a clear plastic tube, which transverses the weeping platform 5. This opening allows the developing mosquito to reach the surface of the water in order to breath. This opening allows the pupa to lie on the surface of the water and when it becomes an adult it can fly into the tower and be observed. Also shown is a debris cover 16 for preventing trash from filling the brood cups and the larva channels. This cover 16 has a center hole 11 for the observation tower 14. Different water levels will allow the tower 14 to slide through the observation tower cutout. This cover has to be made of opaque materials. Also shown is an observation tower cover 17, which will be supported on the debris cover 16, extending over the screen the upper extent of the observation tower. This cover prevents trash from entering the device. Removal or rotation of the cover 17 allows for pouring water into the container. A debris cover support with four supports, which can be in the form of two rails 18 as shown in FIG. 4 is a portal for the female mosquitoes to reach the water filled brood cups. These supports provide about a 1/2" opening.

FIG. 11A illustrates the life cycle of the mosquito in this mosquito control apparatus. Eggs 19 are laid in brood cups 9 formed by the countersunk holes. The developing larvae 20, which of course are larger than the eggs, must descend through the smaller diameter portion 10b of the holes forming the brood cups 9 to find sufficient space to develop normally in the water. The next stage in the development of the mosquito is the pupa stage 21, which is not captive in the water. The pupa stage 21 is too large to escape through the holes 10b in the weeping platform. The only point of escape from the water for the fully developed adult mosquito 22 is into the observation tower 14, from which there is no escape. If there is not observation tower 14, the mosquito cannot escape from the water. In the observation tower, the adult mosquito will die and never escape to the outside environment. The carcass of the dead mosquito will then drop into the water providing organic matter for development of the larva and pupa stages. This device therefore provides a trap for developing mosquitoes. Use of a device in accordance with this invention has demonstrated that the mosquito problem for the user of this device was significantly less than for neighbors. It is believed that mosquitoes do not normally travel far so that by providing a stagnant water trap, mosquitoes in a given area will congregate to this trap, especially if normal precautions are taken to minimize other standing water.

Additional details of the individual components are described in the following description.

A container 1 of stagnant water is offered to the egg laying female mosquito. Water is the essential element for the 3,000 species of mosquito. The beauty of this invention is that it can be made to any size and correspond to the mosquito threat. A coffee size mug is ideal for the home owner. The use of this apparatus makes one a good neighbor. A tub size apparatus can be fabricated for parks, picnic areas, and playgrounds. This invention is especially important during times of drought because the mosquito will have to come to this stagnant water source.

The weeping paraffin platform 5 is the functioning part of this apparatus. This platform is made of paraffin. Paraffin was chosen for its physical and chemical properties. Paraffin will float and this floatation is essential. Paraffin is insoluble in water and is odorless, tasteless and can be machined. The melting point of paraffin is 65 degrees Celsius, which is approximately to 150 degrees Fahrenheit. Even at the most extreme temperature recorded on earth the paraffin platform will function. The highest temperature ever recorded on earth was in El Azizia, Libya in 1922. This temperature was 136 degrees Fahrenheit. The choice of paraffin was also made because it is easy to mold. However, other material can be used to fabricate the weeping platform 5.

Figure 11B:
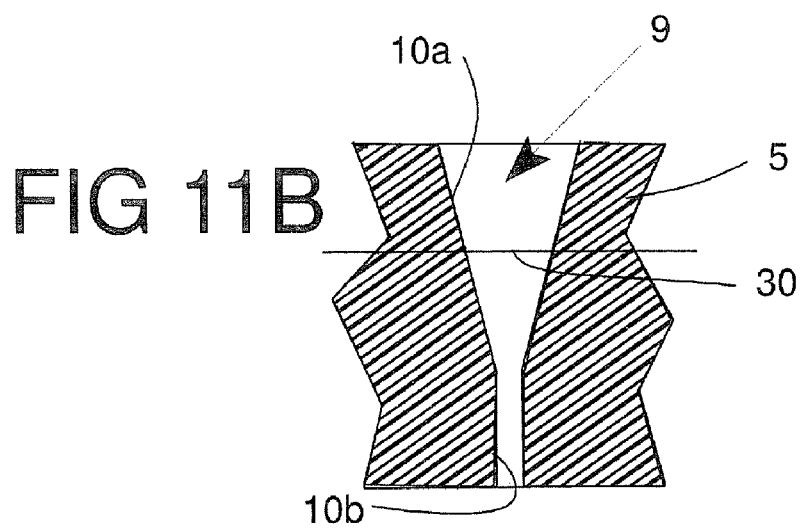
FIG. 11B is a schematic view of a single brood cup showing the water level within the countersunk section of the brood cup.

A series of 1/16" inch holes 10b are drilled around the circumference of the weeping platform. The 1/16" holes 10b have contact with the water in the container. A 5/16" inch counter sink 10a is used to form a little cup of water 9 in the upper surface of the weeping platform. The cups are called "brood cups". The counter sink 10a is at one half the thickness of the weeping platform 5 in the preferred embodiment. The broad cups 9 are the watering hole for the egg laying female mosquito. The brood cup 9 is the Achilles heel for the mosquito. Mosquitoes are very prolific because they will lay eggs in a drop of water on a leaf. Some mosquitoes will even lay eggs on a dry surface in anticipation of the water level rising. In any of these events this apparatus has the mosquitoes confined. The eggs are laid into the small amounts of water afforded by the brood cups 9. The eggs in the brood cups can develop to the early larval stage. During the early larval stage the mosquito can only survive by descending into the depths of the stagnant water container. The larval channel 10b, here comprising a 1/16" hole, has contact with the stagnant water. The eggs can only develop to a certain degree in the counter sink brood cup. The larval channel 10b allows the larva to enter the depth of the stagnant water. The larva has to penetrate the depths of the water in order to feed. At this point there is no escape. They descend through the 1/16" inch hole 10b at the base of the brood cups 9. The larva in order to feed has to wiggle through the stagnant water. The larva is a filter feeder; they do this by wiggling through the water feeding on microorganisms. The larva has to surface periodically to breathe at the waters surface through their siphon. FIG. 11B is the best view for showing the water level 30 in the brood cup. In FIG. 11B, the water level is shown extending through the countersunk section 10a of the brood cup 9, with the narrower section 10b completely full. Portions of the weeping platform 5 will be submerged as shown in FIG. 11B. Of course the exact water level 30 will depend upon the buoyancy and size of the weeping platform 5. The water depicted in other schematics is not intended to be an accurate depiction of the water level, but these other schematics are instead merely intended to represent water within the container 25.

The tower 14 provides a breathing space. This invention allows the mosquitoes to complete their life cycle. Completion of their life cycle serves two purposes, first for educational purposes one can observe the mosquito thorough its life cycle by viewing it through the transparent tower 14. Second the adult captive mosquito will die and fall into the stagnant water and become food for the developing generation.

This is a screened filling port 12 provided at the upper extent of the observation tower 14 will allow one to do is add water occasionally.

There are screened overflow holes 4a at the upper margin of the stagnant water container will inform one when the stagnant water container 25 is full. Another function of the overflow holes 4a, over which a screen 4b extends, is to prevent the weeping paraffin platform 5 from floating out of the stagnant water container 25.

The debris cover 16 extends beyond the outer circumference of the stagnant water container 25. This cover 16 is to prevent trash, leaves from getting into the all important brood cups 9. The debris cover supports or rails 18 allow a space (about ½" inch) for the egg laying female to have access to the brood cups 9, where the female mosquito will lay eggs 19 as shown in FIG. 11A. The mosquito larva which 20 have descended through the 1/16" inch hole at the base of the brood cups 9 to enter the stagnant water and seek food or nutrition. The pupa 21, which develop from the larvae 22, uses its siphon to break the surface of the water in order to breath. The adult (flying) mosquito 22 will be trapped in the observation tower 14, which is optional but allows one to view the success of the product.

We claim:

1. A trap for controlling mosquitoes comprising:
   a container forming a reservoir for stagnant water;
   a platform configured to be positioned in the container and which floats on top of the water when the water is in the reservoir;
   a series of holes extending through the platform to provide access to the stagnant water, each hole of the series of holes having an opening area sufficient to permit the deposit of eggs by an adult female mosquito, but having a diameter less than the size of an adult mosquito, so that the adult mosquito cannot escape through any of the holes; and
   a mesh screen barrier member having both an inner periphery attached to the platform at an outer periphery of the platform and an outer free periphery which extends between the platform and the container and engages an interior surface of the container by slidably abutting the interior surface of the container as the mesh screen barrier member floats and moves with the platform when the platform is positioned on top of the water in the container so that the mesh screen barrier member reduces or prevents escape of the adult mosquitoes from the water.

2. The trap of claim 1 wherein the holes are countersunk having larger areas at the opening areas on a top side of the platform that is exposed to air when the platform is positioned on top of the water in the container to permit larger exposed areas for the adult female mosquito to lay her eggs, and smaller areas on a bottom side of the platform that is opposite the top side to limit escape paths for the adult mosquito.

3. The trap of claim 2 wherein a portion of each hole of the series of holes at the bottom side of the platform has a diameter less than the size of a mosquito pupa.

4. The trap of claim 1 wherein an overflow hole is provided adjacent a top of the container so that the platform will not escape the container in the event excess water enters the container.

5. The trap of claim 4 including a screen covering the overflow hole.

6. The trap of claim 1 wherein the platform is formed of paraffin.

7. The trap of claim 1 including a tower mounted on the platform, the tower fitting over an other hole in the platform so that adult mosquitoes can escape into the tower.

8. The trap of claim 7 wherein the tower is separated from the outside environment by a screen so that mosquitoes cannot escape through the tower, but air can enter the tower so that mosquitoes can breathe air in the tower.

9. The trap of claim 1 including a debris cover elevated above the platform so that debris cannot close the holes in the platform, the debris cover being elevated by a distance sufficient for the mosquitoes to have access to stagnant water exposed in the holes.

10. The trap of claim 9 including supports between the container and the debris cover for elevating the debris cover above the platform.

11. The trap of claim 10 including an observation tower and an observation tower debris cover.

12. The trap of claim 1 wherein the platform comprises a weeping platform.

13. The trap of claim 1 including stagnant water in the container and a nutrient source in the stagnant water.

14. A trap for controlling mosquitoes comprising:
a container forming a reservoir for stagnant water;
a platform configured to be positioned in the container and which floats on top of the water when the water is in the reservoir;
a series of holes extending through the platform to provide access to the stagnant water, each hole of the series of holes having an opening area sufficient to permit the deposit of eggs by an adult female mosquito, but having a diameter less than the size of an adult mosquito, so that the adult mosquito cannot escape through any of the holes; and
a flexible mesh screen barrier member having both an inner periphery attached to the platform at an outer periphery of the platform and an outer free periphery which extends between the platform and the container and engages an interior surface of the container by slidably abutting the interior surface of the container as the mesh screen barrier member floats and moves with the platform when the platform is positioned on top of the water in the container so that the flexible mesh screen barrier member reduces or prevents escape of the adult mosquitoes from the water.

15. A trap for controlling mosquitoes comprising:
a container forming a reservoir for stagnant water;
a platform configured to be positioned in the container and which floats on top of the water when the water is in the reservoir;
a series of holes extending through the platform to provide access to the stagnant water, each hole of the series of holes having an opening area sufficient to permit the deposit of eggs by an adult female mosquito, but having a diameter less than the size of an adult mosquito, so that the adult mosquito cannot escape through any of the holes;
a mesh screen barrier member having both an inner periphery attached to the platform at an outer periphery of the platform and an outer free periphery which extends between the platform and the container and engages an interior surface of the container by slidably abutting the interior surface of the container as the mesh screen barrier member floats and moves with the platform when the platform is positioned on top of the water in the container so that the mesh screen barrier member reduces or prevents escape of the adult mosquitoes from the water;
wherein the platform includes an aperture, the trap further comprising a tower mounted on the platform aperture such that the tower is positioned over the aperture so that adult mosquitoes can escape into the tower for observation; and
a debris cover on a top portion of the container configured to generally prevent debris from blocking the holes in the platform, the debris cover being spaced apart from the container and the platform by a distance sufficient for the mosquitoes to have access to the water exposed in the holes.

* * * * *